Nov. 10, 1936.  A. M. ROSS  2,060,441
WELDING ROD FOR ARC WELDING
Filed March 29, 1934
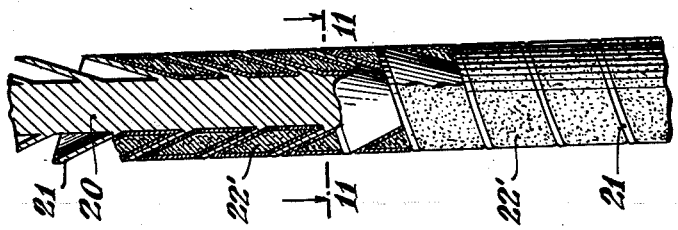 
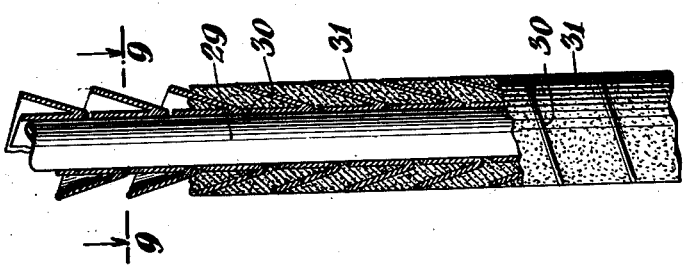 
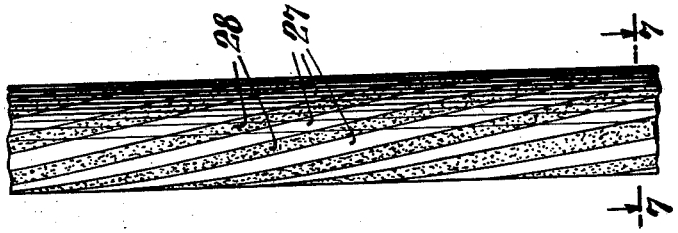 
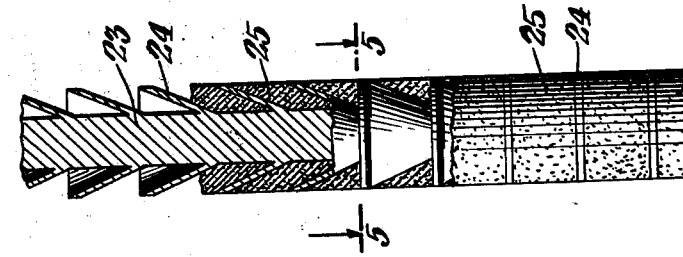 
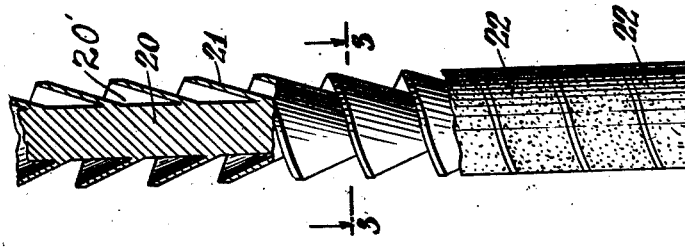 
INVENTOR
Albert M. Ross
BY
Harold Kaplan
ATTORNEY Patented Nov. 10, 1936

2,060,441

UNITED STATES PATENT OFFICE 2,060,441

WELDING ROD FOR ARC WELDING

Albert M. Ross, Ware, Mass.

Application March 29, 1934, Serial No. 717,894

14 Claims. (Cl. 219—8)

The present invention relates to welding rods for electric arc welding and more particularly to flux coated welding rods.

The superiority of flux-coated welding rods over bare welding rods is well known to those skilled in the art of arc welding, the purpose of the flux coating being to assist the welding operation by protecting the weld metal during the period of fusion and after deposit. The flux coated welding rods on the market, however, are unsuitable for use as electrodes in automatic arc welding units and in certain manual welding operations, for the reason that the flux coating insulates the metallic core and provides no means of current conductivity from the outside to the core and to the fusion point. Briefly describing the automatic phase of the welding art, it consists of an automatic feed for the electrode by means of a suitable feed roll arrangement, the electrode passing through a guiding nozzle to the weld zone. The feed rolls or guiding nozzle carry a current which is conducted to the electrode by a rubbing contact with the electrode. Bare electrodes have heretofore been employed for these automatic operations because of the necessity of a current conducting surface. One of the objects of my present invention, therefore, is to provide a flux coated welding rod having means for current conductivity from the outside through the flux coating to the core and to the fusion point, thereby enabling the flux coated welding rod to be used as an electrode in automatic welding and rendering it more desirable for manual welding.

Another object of my present invention is to provide a flux coated welding rod wherein the coating is so applied and arranged on the core of the welding rod as to be effectively retained thereon.

To obtain satisfactory and efficient welding results, it is important to have an arc which is saturated and is confined to a particular welding point. Such results can be obtained only by having a central or axial arcing point on the electrode. In flux coated electrodes wherein the coating is of uneven thickness circumferentially, the arc becomes erratic and tends to stray. This condition is generally to be found in current products, for the construction of these electrodes makes it difficult to obtain a coating of uniform thickness. Another object of my invention, therefore, is to provide a flux coated electrode which is so designed as to insure a uniform coating thickness.

In the art of arc welding, flux coated welding rods are generally used as positive electrodes, in order to obtain the increased heat of the positive pole for speed welding, the heat generated by the arc being confined to the arc area by the heavy coating. It is well known to those skilled in the art, that it is more difficult to weld with a heavily coated electrode in side and overhead positions than in the flat position. In welding in overhead and side positions with heavily coated electrodes, I have found that the generated arc heat has a tendency to make the weld metal flow at such a rate that the globule of weld metal cannot build up, so as to cross to the deposit point through the arc by capillary attraction. Due to this condition, bare or lightly coated welding rods used as negative electrodes have, heretofore, been more desirable for such welding operations. Another object of my invention, therefore, is to provide a heavily coated electrode which is efficient and practical for use in overhead and side position welding operations.

Still another object of the present invention is to provide a flux-containing element which is flexible in character and is adapted to be wound around the core of the welding rod for the purpose of providing a coating therefor.

Other objects and advantages of the present invention will be pointed out hereinafter and will partly be apparent to those skilled in the art to which the present invention relates.

With the above and other objects in view, the present invention consists of the novel construction and arrangement of parts hereinafter described and illustrated in the accompanying drawing. It will be understood, however, that I do not intend to limit myself to the specific embodiments of my invention shown and described herein, slight variations in the details of construction being possible without departing from the spirit and scope of the invention as outlined in the appended claims.

In the accompanying drawing, wherein like reference characters indicate corresponding parts throughout the several views:

Fig. 1 is a longitudinal view of the preferred embodiment of my invention;

Fig. 2 is an enlarged longitudinal view partly in section of the embodiment shown in Fig. 1;

Fig. 3 is a cross sectional view of Fig. 2 along the line 3—3;

Fig. 4 is an enlarged longitudinal view partly in section of a modified embodiment of my invention;

Fig. 5 is a cross section view of Fig. 4 along the line 5—5;

Fig. 6 is an enlarged longitudinal view partly in section of another modified embodiment of my invention;

Fig. 7 is a cross sectional view of Fig. 6 along the line 7—7;

Fig. 8 is an enlarged longitudinal view partly in section of still another modified embodiment of my invention;

Fig. 9 is a cross sectional view of Fig. 8 along the line 9—9;

Fig. 10 is a view similar to Fig. 2 showing my improved flux-containing element; and Fig. 11 is a cross sectional view of Fig. 10 along the line 11—11.

As illustrated in Fig. 2, the preferred embodiment of a welding rod constructed in accordance with my invention comprises a core 20 composed of any fusible metal or alloy, having undercut helical grooves 20' in the periphery of the core forming upwardly and outwardly extending ribs 21 integral with the core. Arranged within the helical grooves 20' between the spires formed by the ribs 21 but not covering the extremities thereof is a flux coating 22 composed of any suitable arc sustaining and slag forming material.

The angularly disposed ribs 21, it will be observed, form a means for current conductivity from the outside to the core, thereby making the electrode suitable for use as an electrode in automatic welding units for continuous welding operations, as indicated above. In order to obtain a current path to the weld zone, substantially along the core of the electrode, so as to provide a central or axial arc at the welding point, my improved welding rod is designed on a potential, conduction and relative resistance basis; i. e. there being a definite relationship between the cross sectional area of the core, the pitch of the spiral, and the thickness of the rib. Good results have been obtained with a welding rod having a core of ⅛" diameter, the rib being $\frac{1}{32}$" in thickness and a spiral pitch of ¼". The depth of the undercut helical groove 20' would depend entirely on the thickness of the coating desired.

It will be seen in Fig. 2 of the drawing that the undercut helical grooves 20' provide pockets on the surface of the core whereby the flux coating is keyed thereto, thus permitting the welding rod to be bent and roughly handled without injury to the coating. It will also be observed that due to the novel construction of my improved welding rod, wherein the undercut helical groove 20' has a uniform depth throughout the entire length of the electrode, a uniform flux coating thickness surrounding the core is provided for. The coating thickness may be varied by providing a greater or less degree of spiral pitch and depth of the groove, so as to obtain any desired coating thickness for proper protection and fluxing action during the welding process.

Under actual test it has been shown that the globule build up in my improved welding rod is the same as that found in bare welding rods, thus rendering my improved flux coated welding rod very effective for position welding, using the welding rod as a positive electrode. Furthermore, it required less skill to weld in the flat position than with the standard heavily coated welding rod.

Another characteristic of my improved welding rod is the cupping effect provided by the angularly disposed ribs 21. This cupping effect tends to control the direction of flux flow, and also tends to break up continuous fluxing action. Continuous fluxing action is interrrupted due to the ribs 21 having a different melting point than the flux in which it is imbedded, and the direction of flux flow is controlled due to the continuous shifting of the ribs 21 throughout the flux mass while the welding rod is being consumed.

The coating of my new welding rod with flux may be accomplished in the conventional way; that is, by applying the flux in a plastic state, after which the excess is removed by wiping. The flux thus covers the core and fills the grooves between the ribs but does not cover the extremity thereof. The flux is then dried in the customary manner. I prefer, however, to employ a method of flux coating which is entirely new with reference to standard practice, inasmuch as it provides a mechanical means for flux coating. My preferred means for flux coating comprises a sheath of any length which is made of paper, braid, or any other flexible material having the required diameter, which is filled with a desired fluxing material in a powdered state. Alloying material may also be incorporated in this dry material. The flux containing sheath is then applied to the core of the welding rod by wrapping it spirally within the peripheral grooves between the ribs, after which it is pressed into the pockets formed by the grooves and is thereby securely retained on the surface of the core of the welding rod. I have found that a conventional flux, pulverized to 200 mesh, and contained in a sheath as described above, applied to the welding rod in the manner stated, packs into the pockets of the welding rod sufficiently tight to enable one to bend the welding rod 180 degrees without loosening the flux container. While I have described merely the application of this new flux containing means to my improved welding rod, it will be apparent to those skilled in the art of arc welding that its application is not limited thereto, but may be employed with equal advantage in almost any other type of welding rod.

I shall now proceed to describe some of the modifications of my present invention, reference being made to the accompanying drawing.

In Fig. 2, I have shown the angularly disposed ribs 21 integral with the core 20. This construction may be modified by substituting an edging which is detached from the core, consisting of a flat band or strip of metal wound helically around the core in such manner that it is angularly disposed relative to the surface of the core. This construction may be further extended even to the point where the core may consist of a plurality of metal strands alike or different in character, which are twisted or braided into a core. The core may even be composed of flux material or a suitable alloy compound if desired. There may be also provided a plurality of angularly disposed edgings helically surrounding the core, instead of a single edging.

In Figs. 4 and 5, I have shown a welding rod embodying the principle of my invention which consists of a core 23 having a plurality of undercut circumferential grooves forming angular ribs 24 integral with the core 23 and distributed longitudinally along the length of the welding rod. The flux coating 25 is arranged on the surface of the core 23 and fills the circumferential grooves between the angularly disposed ribs 24 but does not cover the extremities thereof. It will be apparent to those skilled in the art that this modified construction will provide the same advantages as the preferred embodiment of my invention shown in Fig. 2. This modified construction may be further extended by substituting bell shaped rings of like or different metals spaced longitudinally along the core, in place of the angularly disposed ribs integral with the core.

In Figs. 6 and 7, I have shown another modified form of my invention, which consists of a metallic core 26 having undercut grooves in the periphery thereof, which grooves are arranged longitudinally and wind helically around the circumference of the core, and are filled with a flux coating 28. This modification is an extension of the embodiment illustrated in Figs. 2 and 3.

In Figs. 8 and 9, I have shown a welding rod constructed in accordance with my invention which consists of a core 29 made of any fusible metal and a U-shaped edging 30 winding helically around the core 29. A flux coating 31 is applied to the surface of the core 29 and is arranged between the spires formed by the U-shaped edging, the outside extremity of the edging being left exposed. This construction may be further modified by providing a plurality of U-shaped edgings, of like or different metals, in place of a single winding.

In Figs. 10 and 11, I have shown a welding rod similar to that illustrated in Figs. 2 and 3, showing the use of my improved mechanical fluxing means 22', which consists of a flexible sheath containing dry flux which is applied to the core 20 by wrapping it spirally within the grooves 20' between the angularly disposed ribs 21.

Other modifications may suggest themselves to those skilled in the art to which the present invention relates, which will fall within the scope and spirit of my present invention. I also desire it to be understood that welding rods constructed in accordance with my invention are not limited to their application to automatic arc welding but may be employed with equal advantage in manual welding operations. Their application may even be extended to gas welding operations.

Having thus described and illustrated my present invention, what I claim as new and desire to secure by Letters Patent is:

1. A welding rod for arc welding comprising a core of fusible metal having an undercut helical groove in the periphery thereof and a coating material arranged within said groove but not covering the external periphery of the core thereby permitting the conduction of welding current thereto.

2. A welding rod for arc welding, comprising a core of fusible metal having a plurality of undercut helical grooves in the periphery thereof and a coating material arranged within said grooves but not covering the external periphery of the core thereby permitting the conduction of welding current thereto.

3. A welding rod for arc welding comprising a core of fusible metal having an undercut helical groove in the periphery thereof forming pockets on the surface of the core, and a coating material arranged within said groove and keyed to the core within said pockets.

4. A welding rod for arc welding comprising a core of fusible metal having a plurality of undercut helical grooves in the periphery thereof forming pockets on the surface of the core, and a coating material arranged within said grooves and keyed to the core within said pockets.

5. A welding rod for arc welding comprising a core of fusible metal, an angularly disposed metallic band helically surrounding the surface of the core and forming pockets thereon, and a coating material arranged on the surface of the core between the spires of the metallic band and keyed to the core within said pockets.

6. A welding rod for arc welding comprising a core of fusible metal, a plurality of angularly disposed metallic bands helically surrounding the surface of the core and forming pockets thereon, and a coating material arranged on the surface of the core between the spires of the metallic bands and keyed to the core within said pockets.

7. A welding rod for arc welding comprising a core of fusible metal having a series of annular undercut grooves in the periphery thereof, said grooves being parallel and spaced longitudinally on the surface of the core, and a coating material arranged within said grooves but not covering the external periphery of the core thereby permitting the conduction of welding current thereto.

8. A welding rod for arc welding comprising a core of fusible metal having a series of annular undercut grooves in the periphery thereof, said grooves being parallel and spaced longitudinally on the surface of the core and forming annular pockets thereon, and a coating material arranged within said grooves and keyed to the core within said pockets.

9. A welding rod for arc welding comprising a core of fusible metal, a series of bell shaped metallic rings surrounding the surface of the core and spaced longitudinally thereon and a coating material arranged on the surface of the core between the bell shaped metallic rings, but not covering the external peripheral edge thereof thereby permitting the conduction of welding current thereto.

10. A welding rod for arc welding comprising a fusible core, a series of bell shaped metallic rings surrounding the surface of the core and spaced longitudinally thereon, whereby annular pockets are formed on the surface of the core, and a coating material arranged on the surface of the core between the metallic rings and keyed to the core within said pockets.

11. A welding rod for arc welding comprising a fusible metallic core having upwardly and outwardly extending annular ribs spaced longitudinally on the surface thereof and a non-conducting coating material arranged on the core but not covering the external edges of the ribs, to provide for current conductivity from without to the center of the core.

12. A welding rod for arc welding comprising a fusible metallic core having upwardly and outwardly extending ribs winding helically around the surface thereof, and a non-conducting coating material arranged on the core but not covering the external edges of the ribs, to provide for current conductivity from without to the center of the core.

13. The method of controlling the flow of flux in flux coated welding rods, which consists of providing the core of the welding rod with upwardly and outwardly extending annular ribs spaced longitudinally along its length, said annular ribs being imbedded in and penetrating the flux coating of the rod.

14. The method of controlling the flow of flux in flux coated welding rods, which consists of providing the core of the welding rod with upwardly and outwardly extending ribs winding helically along its length, said helical ribs being imbedded in and penetrating the flux coating of the rod.

ALBERT M. ROSS.